(12) United States Patent
Loeser

(10) Patent No.: US 6,536,372 B1
(45) Date of Patent: Mar. 25, 2003

(54) APPARATUS FOR ASSISTING ANIMALS IN ASCENDING ELEVATED AREAS

(76) Inventor: William A. Loeser, P.O. Box 6105, Riyad (SA)

( * ) Notice: Subject to any disclaimer, the term of this patent is extended or adjusted under 35 U.S.C. 154(b) by 0 days.

(21) Appl. No.: 09/820,122

(22) Filed: Mar. 28, 2001

(51) Int. Cl.⁷ .............................................. A01K 29/00
(52) U.S. Cl. ........................................ 119/28.5; 5/658
(58) Field of Search ................................. 119/843, 845, 119/846, 847, 848, 849, 482, 485, 28.5; D30/118, 119; D34/32; 5/658, 659, 661, 662, 308, 424–430; 14/69.5; 193/38, 41

(56) References Cited

U.S. PATENT DOCUMENTS

| | | | | |
|---|---|---|---|---|
| 2,562,333 A | * | 7/1951 | Ries | 5/504.1 |
| 2,567,630 A | * | 9/1951 | Whittier et al. | 312/235.1 |
| 2,576,455 A | | 11/1951 | Gratt | 5/354 |
| 3,370,306 A | | 2/1968 | Lovette | 5/327 |
| 3,618,568 A | | 11/1971 | Breeden | 119/19 |
| 4,601,632 A | * | 7/1986 | Agee | 14/71.1 |
| 4,624,619 A | * | 11/1986 | Uher | 14/71.1 |
| 5,038,434 A | | 8/1991 | Navarrette | 5/507 |
| 5,161,484 A | * | 11/1992 | Duane | 119/28.5 |
| 5,213,060 A | | 5/1993 | Sloan et al. | 119/82 |
| 5,581,829 A | * | 12/1996 | Lee | 224/42.11 |
| 5,628,078 A | | 5/1997 | Pennington et al. | 5/618 |
| 5,642,537 A | | 7/1997 | Johnson | 5/81.1 HS |
| 5,642,541 A | | 7/1997 | Corbin | 5/507.1 |
| 5,787,530 A | | 8/1998 | Brix | 5/662 |
| D420,175 S | * | 2/2000 | Garrels, Jr. | D30/119 |
| 6,267,082 B1 | * | 7/2001 | Naragon et al | 119/849 |

* cited by examiner

Primary Examiner—Peter M. Poon
Assistant Examiner—Susan Piascik
(74) Attorney, Agent, or Firm—Womble Carlyle Sandridge & Rice, PLLC

(57) ABSTRACT

An apparatus for assisting a small or infirmed animal in ascending an elevated area having a substantially flat housing, and a platform having a generally flat surface, whereby the platform is mounted to slide in and out of the housing, so that when the platform is withdrawn from the housing, the platform provides a step for assisting an animal in reaching the elevated area.

4 Claims, 3 Drawing Sheets

APPARATUS FOR ASSISTING ANIMALS IN ASCENDING ELEVATED AREAS

FIELD OF THE INVENTION

The present invention relates to the field of animal care, and, more particularly, to an apparatus for assisting small animals in reaching elevated areas such as beds without the need for human assistance.

BACKGROUND OF THE INVENTION

For centuries, animals of all varieties have been domesticated for the purpose of making them household pets. Many have actually been bred and domesticated as predominantly indoor pets where they provide companionship and security for their human owners. Not unexpectedly, these pets remain close to their owners at all times and often sleep in the same general area, either at the foot of the bed or on the floor beside the bed.

However, for those pets that become aged and begin suffering from various infirmities, jumping on and off of elevated surfaces such as a bed is not possible. The same is true for smaller animals that are unable to reach such elevated areas without human assistance and are then subject to injury, such as hip displatia or broken bones, from jumping off of such places. This means that their human owners must assist them on and off of such surfaces, often at great inconvenience.

There are known in the art a variety of beds designed for small pets such as dogs and cats, but these are by and large intended for placement on a floor, thus depriving the animal of being close to its owner. There are also known in the art step stools, chairs, and ladders of different types, but these are unsightly, create an obstruction, and pose tripping or falling hazards for the human owners.

SUMMARY OF THE INVENTION

The present invention is directed to an apparatus for assisting small or infirmed animals in ascending elevated areas that addresses the problems described above. Specifically, the apparatus provides a convenient platform housing or frame that may be placed between a mattress and the box springs of a bed. A platform may be withdrawn from the frame for use by the pet as an intermediate step in reaching the top of the bed. When not needed for that purpose, the platform can be disposed within its storage housing out of view under the mattress, eliminating any possible hazardous obstruction. The apparatus of the present invention is described for use with a bed; however, the apparatus may be used in countless other applications including other pieces of furniture such as chairs and couches or sofas with separate seat cushions.

One aspect of the present invention is to provide an apparatus that includes a housing and a platform disposed within the housing. The housing is formed as a substantially flat construction having opposed sides, and at least one open end. Because the housing is relatively thin, it may be situated, for example, beneath a conventional mattress of a bed without distorting the appearance or shape of the bed and without creating discomfort of persons using the bed. The housing is designed for placement across the width of the bed, but may alternatively be placed lengthwise.

A substantially planar platform is mounted within the housing. The platform is dimensioned so that it can be completely inserted within the housing. When the platform is withdrawn from the housing, it extends outwardly in general horizontal relation to the floor. To ensure proper support so that the installed apparatus does not pivot upward when an animal ascends the platform, the housing is at least about 75 to 85 percent of the width of a conventional double bed mattress, and desirably the full width of the mattress. When the housing is the full width of a conventional full-size mattress, the housing with inner platform can be as little as 8 inches in width to accommodate cats and small dogs ranging in size from about 3 to 10 pounds. When the width is increased to between 10 and 15 inches, the platform will support an animal up to about 20 pounds, without creating any noticeable distortion in the overlying mattress or cushion. Alternatively, the apparatus may be sized to beneath the seat cushions of a sofa or couch, provided the weight and depth of the seat cushions are sufficient to hold down and support the housing and platform, or fasteners such as hooks, clips, or gripping devices are used to hold down the housing in place. Further, the apparatus may be incorporated into an article of furniture during the furniture construction. For example, the housing, or platform support structure may be constructed in the frame structure of a sofa or other item of furniture.

The platform forms an intermediate step at a position between the floor and the top of the bed upon which a small, aged, or infirmed animal can climb or jump in ascending or descending the bed or other elevated area. To facilitate the withdrawal and insertion of the platform, slides, guides, rollers, or a combination thereof may be employed, although they are not required. Likewise a handle or other pull means may be fastened to the leading portion of the platform to aid in pulling it from within the housing.

To prevent the animal from slipping off the platform when ascending or descending the platform, a slip-resistant material may be affixed to at least some portion of the upper surface of the platform. This material may be fabric, a coating, or any other suitable material that provides a suitable degree of slip-resistance.

A second embodiment of the present invention provides for an apparatus wherein the platform having a horizontal portion, and a hinged portion that pivots downward from the horizontal portion to form a ramp for animals that are even incapable of ascending an intermediate step.

These and other aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed.

These and other aspects of the present invention will become apparent to those skilled in the art after a reading of the following description of the preferred embodiment when considered with the drawings.

DESCRIPTION OF THE PREFERRED EMBODIMENTS

Figure 1:
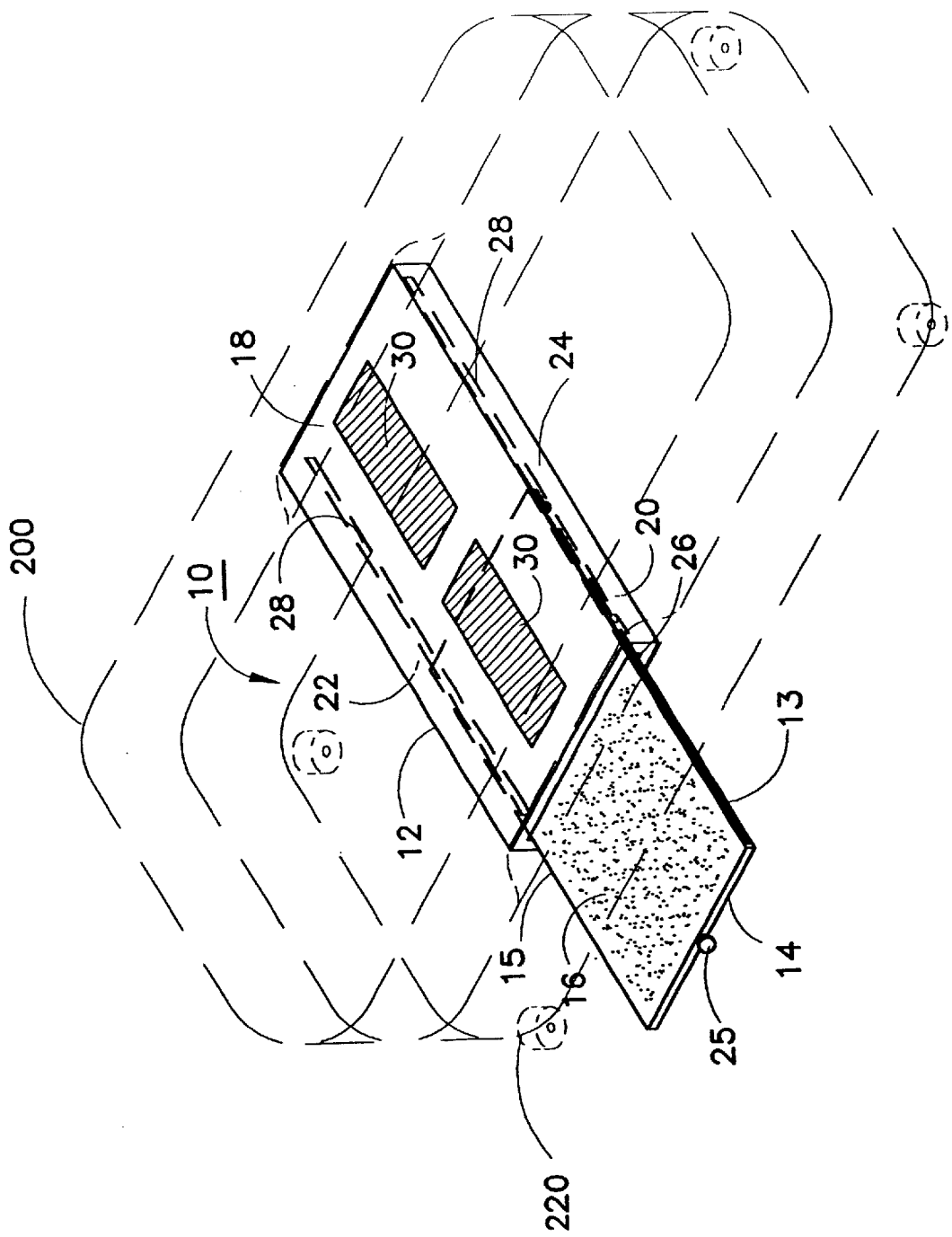
FIG. 1 is an environmental perspective view of the apparatus of the present invention.

Referring now to the drawings in general and FIG. 1 in particular, it will be understood that the illustrations are for the purpose of describing a preferred embodiment of the invention and are not intended to limit the invention thereto. As best seen in FIG. 1, an apparatus for assisting small or infirmed animals to ascend an elevated area, generally designated 10, is shown constructed according to the present invention. The apparatus 10 includes a housing 12 and a platform 14.

The housing 12 is substantially flat and thin, having opposed planar upper and lower walls 18, 20 and opposed sidewalls 22, 24. As used herein, "substantially flat" means having a horizontal, level surface without any appreciable slope, tilt, or curvature. When laid flat, the housing should be no more than about 1¼ to 1½ inches thick so that the apparatus 10 may be placed beneath a mattress or other cushion without appreciably altering the appearance or shape of the mattress and without creating discomfort to the human occupants of the bed. The length of the housing 12 is approximately equal to the width of a mattress; e.g., for a double bed, the housing 12 would be about 50 inches long, and for a queen size bed, the housing 12 would be approximately 60 inches long. Housing 12 is constructed of wood, with the upper and lower 18, 20 walls formed of thin sheets, such as plywood or pressed wood. To provide strength and rigidity to the elongated housing, the sidewalls 22, 24 are formed of thin strips sandwiched between upper and lower walls 18, 20. The side walls 22, 24 may be fastened to upper and lower walls 18, 20 with mechanical fasteners such as screws or bolts or may be banded together or adhered to one another using an adhesive such as wood glue, commonly available and known in the art. Alternatively, housing 12 may be formed of other rigid or semi-rigid materials, including, but not limited to plastic or composite materials. Further, housing 12 may be molded or extruded as a single piece using molding and extrusion techniques well known in the art. To prevent housing 12 from sliding from its desired orientation between the mattress and box springs, at least one of the upper and lower walls 18, 20 is textured or has a material 30 affixed thereto to provide a suitable level of slide-resistance. In the preferred embodiment, this is a coarse fabric, including, but not limited to, felt, cotton, or burlap that is attached to one or both sidewalls 18, 20. Alternatively, fasteners or bands and hooks may be employed to secure the apparatus 10 in place.

Figure 2:
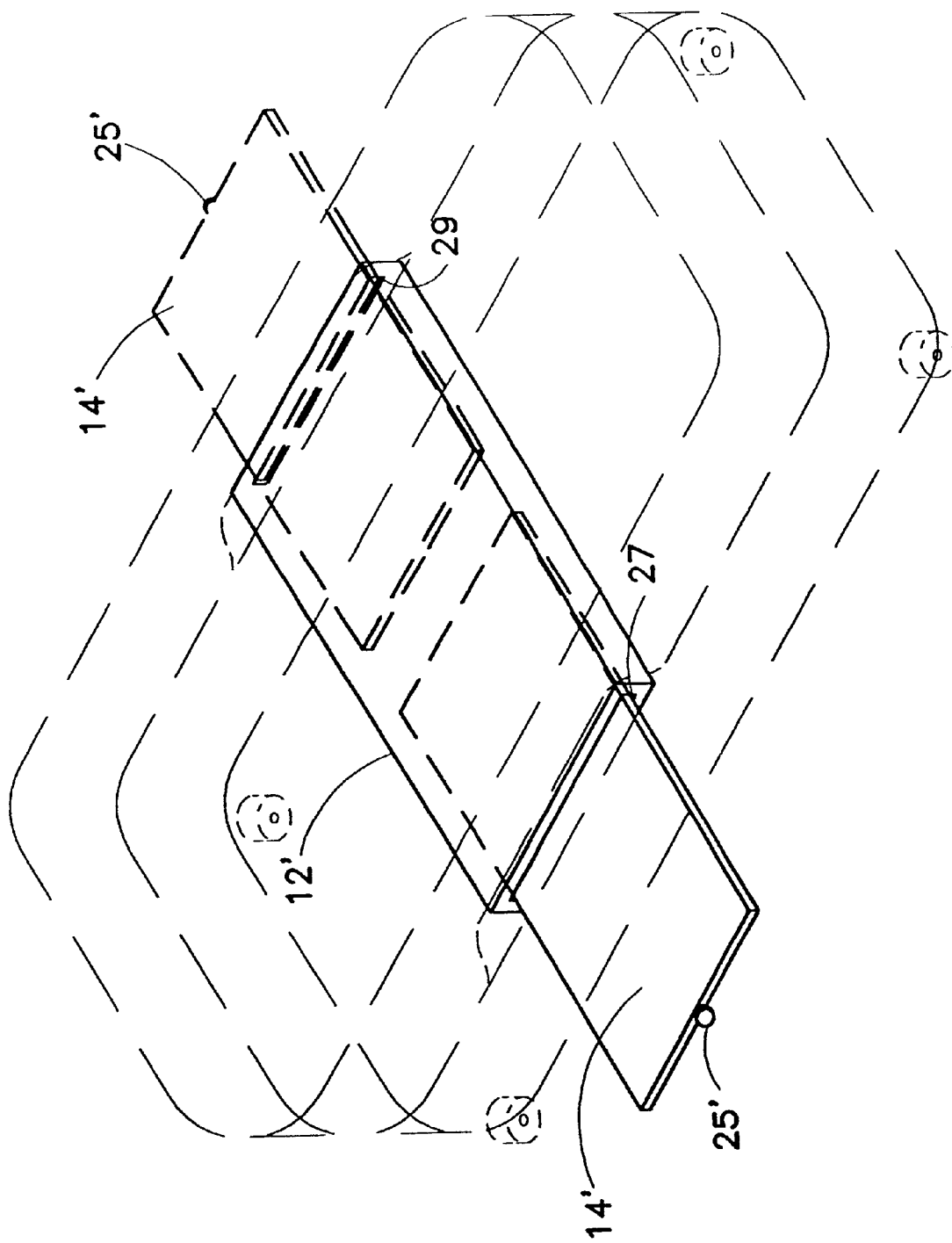
FIG. 2 is an environmental perspective view of the apparatus of the present invention with a housing open at both ends.

An opening 26 is formed in at least one end of housing 12 to receive platform 14. As shown in FIG. 1, a single opening 26 is formed in housing 12 so that the platform is accessible from only one end of housing 12. Alternatively, as shown in FIG. 2, housing 12 is formed with similarly formed openings 27 and 29 at opposed ends of housing 12'.

As shown in FIG. 1, platform 14 is mounted in housing 12 in such a manner that it may be slidably inserted or withdrawn from the housing. In its simplest construction, platform 14 conforms in shape to opening 26 and is dimensioned slightly smaller than opening 26 so that sufficient clearance is provided for easily withdrawing or inserting platform 14 out of or into housing 12. For ease of slidable movement, slide assemblies 28 are fastened to the inner surfaces of side walls 22, 24 and to the opposed sides 13, 15 of platform 14. Slide assemblies 28 of this type are conventional in the art, such as for use on drawers, and commonly available in a number of different shapes and forms of attachment. In the preferred embodiment, the side assemblies are comprised of left and right pairs of guide rails and runners that slidably connect the inner walls of the housing 12 to opposite sides of the platform 14. Alternatively, slide mechanisms may be fastened to one inner surface of bottom wall 20 and to the bottom wall of platform 14. Where housing 12' is formed with openings 27 and 29 at opposed ends (FIG. 2), a single elongate platform 14' may be inserted therethrough so that platform 14' may be withdrawn from either end. Since housing 12' is dimensioned to approximate the width of the bed, platform 14' is accessible for use from either side of the bed. Alternatively, the platform can be formed as two portions so that a platform portion at each end of housing 14' can be withdrawn at the same time.

Where slide assemblies 28, such as the type shown in FIG. 1 are employed, opening 26 must be enlarged accordingly to accommodate the additional space required for such hardware.

To facilitate grasping the platform, a handle 25, 25' is attached to the leading end of platform 14. Any form or type of handle 25 is acceptable so long as it does not interfere with insertion of platform 14, 14' into housing 12, 12'.

To prevent a small or infirmed animal from accidentally slipping from the platform when ascending or descending, a slip-resistant material 16 is affixed to at least some portion of the upper surface of the platform 14. The slip-resistant material may be a fabric, coating, or semi-abrasive material such as a sandpaper-type material. Alternatively, the upper surface of platform 14 may be so textured, such as by calendaring, when formed to provide sufficient slip-resistance.

Figure 3:
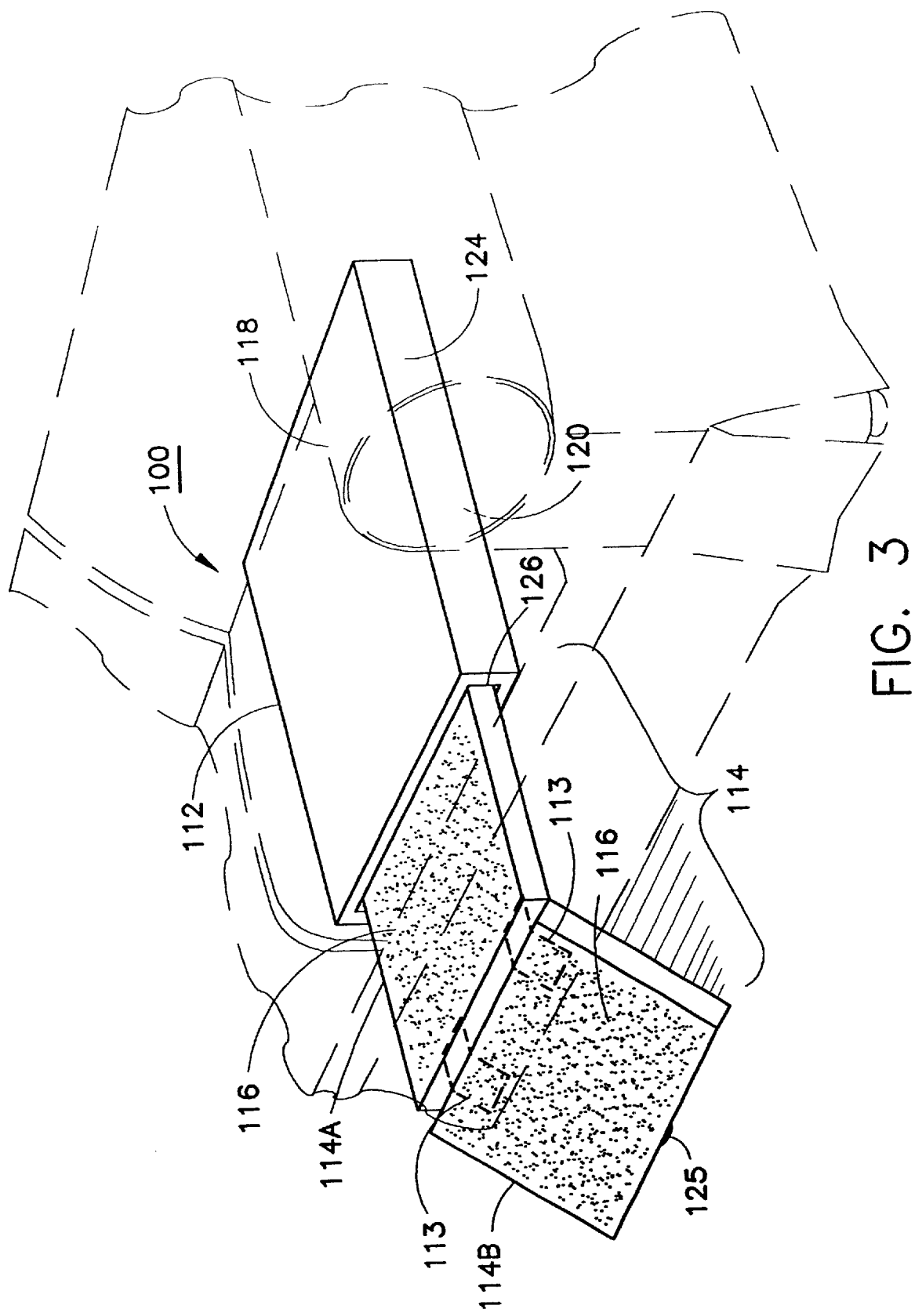
FIG. 3 is an environmental perspective view of an alternative embodiment of the apparatus of the present invention wherein the platform includes a ramp.

As best seen in FIG. 3, platform 114 may be comprised of two or more sections, hingedly connected together. In this alternative embodiment, platform 114 consists of section 114A and 114B hingedly connected together with hinges 113 where the hinges are attached to sections 114A and 114B on the bottom surfaces thereof. When platform section 114B is completely withdraw from housing 112, it forms a ramp for the animal to walk up to reach that part of horizontal section 114A that has been withdrawn. As in the first embodiment, a slip-resistant material 116 is affixed to at least some part of platform 114. To insert platform 114 into housing 112, platform section 114B is simply pivoted upward and pushed. A handle 125 may be attached to the leading edge of section 114B to facilitate grasping the platform.

FIGS. 1 through 3 illustrate in environmental views how the apparatus 10, 100 of the present invention is positioned for use beneath a conventional bed mattress. As shown, the apparatus 10, 100 is oriented across a substantial width of the bed beneath mattress 200 and on top of a supporting surface 220 such as box springs, a base, etc. Once in the desired position, mattress 200 is placed in its normal position so that the apparatus 10, 100 is sandwiched between the supporting surface 220 and mattress 200. It will be appreciated by those skilled in the art that the length of housing 12, 12' of apparatus 10, 100 is dictated by the desired length of platform 14, 14' and the necessity to have a sufficient length held in place beneath mattress 200 so that the entire apparatus 10, 100 cannot pivot upward about the edge of the supporting surface 220 when platform 14, 14' is mounted by an animal.

Certain modifications and improvements will occur to those skilled in the art upon a reading of the foregoing description. It should be understood that all such modifications and improvements have been deleted herein for the sake of conciseness and readability but are properly within the scope of the following claims.

I claim:

1. An apparatus for assisting a small animal in ascending and descending a bed for humans, comprising:
   (a) a substantially thin, flat housing having opposed sides and opposed open ends, said housing so dimensioned for placement between a mattress and box spring of said bed;

(b) a platform having a substantially planar upper surface, said platform so mounted in said housing that said platform may be selectively moved between a closed position and an open position from either of said opposed ends;

(c) a slip resistant material affixed to at least some portion of said upper surface of said platform; and (d) the platform providing a step for assisting a small animal in ascending said bed when withdrawn from the housing.

2. The apparatus of claim 1 further including a slip resistant material affixed to at least some portion of at least one of said opposed sides of said housing.

3. An apparatus for assisting a small animal in ascending and descending a bed for humans, comprising:

(a) a substantially thin, flat housing having opposed sides and opposed ends, said housing so dimensioned for placement between a mattress and box spring of said bed;

(b) a platform comprising at least two planar sections having upper surfaces, said at least two planar sections joined by a hinge, said platform so mounted in said housing that said platform may be selectively moved between a closed position and an open position from either of said opposed ends;

(c) a slip resistant material affixed to at least some portion of said upper surfaces of said at least two planar sections; and (d) said platform is slidably withdrawn from either end of said housing, the outermost of said planar sections forms a ramp and the innermost of said planar sections forms a step, for assisting a small animal in ascending said bed.

4. The apparatus of claim 3, further including a slip resistant material affixed to at least some portion of at least one of said opposed sides of said housing.

* * * * *